Figures 1, 2:
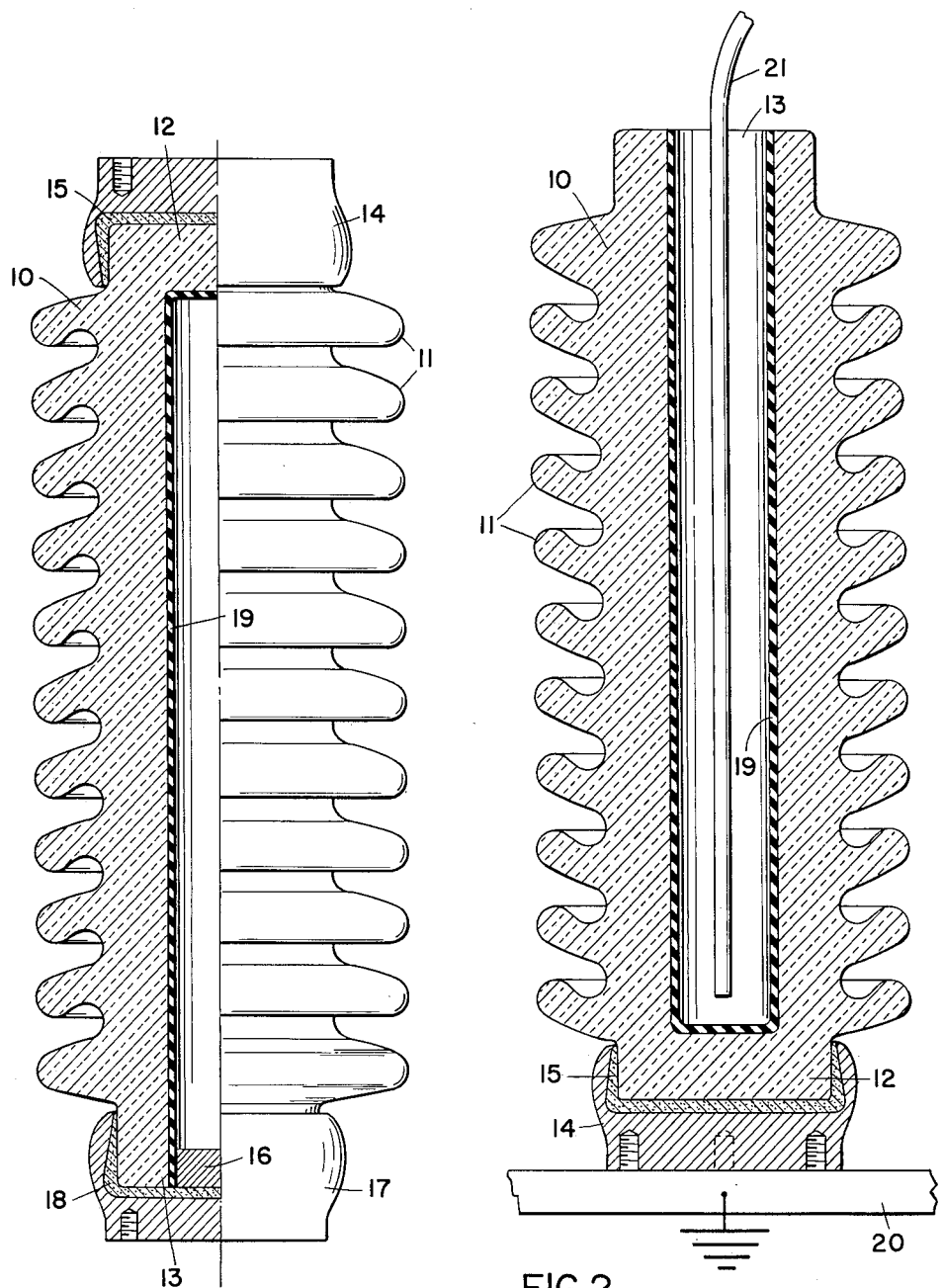

INVENTORS
CARL D. FIERO
CHARLES E. COREY
BY
their attorneys ated May 30, 1961

2,986,595
POST TYPE INSULATOR AND METHOD OF MAKING THE SAME

Carl D. Fiero and Charles E. Corey, Le Roy, N.Y., assignors to Lapp Insulator Company, Inc., Le Roy, N.Y., a corporation of New York Filed Oct. 15, 1958, Ser. No. 767,388

3 Claims. (Cl. 174—178)

This invention relates to post type electrical insulators such as commonly employed, for example, in electric station installations, comprising an elongated, hollow ceramic body with a plurality of integral petticoats, one end of the body being closed and the other open, with metallic caps on the body ends, one for mounting it on a support and the other for connection with a conductor or with one or more additional insulators, as hereafter described and as well understood in the art.

In the manufacture and testing of such insulators for high voltage service, each such ceramic or porcelain body is subjected to a routine flashover test by inverting it with its open end uppermost, inserting a high voltage conductor through the open end into its cavity, the lower end of the body with or without its metal cap resting upon a grounded plate. The voltage is then applied to the conductor to "flashover" the body for a sufficient length of time to detect any defects in the ceramic material. This method of testing is successful in eliminating defects in the porcelain material, but insulators indicated by such testing to be free of porcelain defects, have been found subject, as manufactured or after a period of use, to wide variations in leakage currents and high power factor. It was supposed, prior to our invention, that these unfavorable characteristics were due to contamination of the exposed external surfaces of the insulator, aggravated by varying atmospheric moisture, under an assumption that the enclosed internal surfaces remained protected and free from such contamination. Solution of the problem was further complicated by the field testing of insulators in assembly with supporting equipment and circuit parts and the difficulty of isolating and locating the causes of such unfavorable characteristics. We have discovered, after prolonged and intensive research, that the defect mainly resides, contrary to the previous assumptions, not in the contamination of the external surfaces but in a contamination of the internal surfaces introduced by a step in the above manufacturing test. The high voltage creates a corona effect in the cavity, believed to produce ozone combining with atmospheric elements such as nitrogen and moisture to form nitrous acid, in an amount dependent to some extent on atmospheric conditions. This and other contaminants occurring during manufacturing operations commonly result in contaminating deposits on the inside surfaces of the body, of a more or less electrically conductive nature forming continuous leakage paths. Such surface conductivity causes an undesirably high power factor and radio noise and reduces the flashover voltage values.

This problem exists not only during the manufacture and electrical testing of the body, but later on, as well, in the use of the insulator where its cavity has not been effectively sealed against the entrance of moisture, or where the seal has developed leakage and the entrance of moisture during use, as a result, for example, of the development of internal leakage currents.

Several attempts have been made to solve this problem, the most successful being to remove as much moisture as possible from the atmosphere in the cavity, with or without filling the cavity with a dry gas, or the insertion of a suitable desiccant, and plugging the end of the body to close its cavity against exposure to moisture. Such attempts, however, have not been uniformly successful or satisfactory, particularly as against incomplete sealing of the cavity, or the breaking or other failure of the seal in use, with the result of entrance of moisture and the objectionable results referred to above.

In accordance with our invention we protect the inner surfaces themselves by coating them before testing with a film which prevents the formation thereon of the moisture and other contaminants mainly responsible for internal leakage currents and high power factor. We have found that by the practice of our invention the operating characteristics of such insulators can be reliably controlled and predicted within satisfactory limits and with the further advantage of simplifying the field testing of installations in use. Our invention thus resides in part in the discovery that the application of high voltage and corona to the internal surfaces of the insulator, in testing during manufacture, creates a contamination on such internal surfaces which is the cause of leakage currents, injured seals and high power factor, as well as in the provision of the means and method for eliminating the defect and insuring uniform and better operating characteristics.

One object of the invention, therefore, is to provide an improved insulator of this type having more effective operating characteristics, both in testing during manufacture and during its useful life and also to provide a more durable construction.

Another object, more specifically stated, is to provide an insulator of the above character operating with lower leakage currents, a lower power factor, less radio noise and an increase in flashover voltage values.

A further object is the provision of a simple, practical and economical method of manufacturing such insulators having the above advantages.

To these and other ends the invention resides in certain improvements and combinations of parts and method steps, all as will be hereinafter more fully described, the novel features being pointed out in the claims at the end of the specification.

In the drawings:

Fig. 1 is an elevation, partly in section, of a post type insulator embodying the invention, and Fig. 2 is a sectional elevation of the insulator, partly assembled, and arranged for electrical testing during manufacture.

The embodiment of the invention, herein disclosed by way of illustration, preferably comprises an elongated hollow body 10 made of ceramic or porcelain material, with a plurality of integral petticoats 11 and having its upper end 12 closed and its lower end 13 open. The upper end is provided with a metal cap 14 secured to the body by cement 15. The lower end is closed by a plug 16 and this end has a metal cap 17 fixed thereon as by cement 18, the construction so far described being well known in the prior art.

We have discovered the cause of the operating defects of such prior art constructions pointed out above and that the problem which they have presented can be successfully and satisfactorily solved by covering the interior or cavity surfaces of the body by a coating 19 of water-repellent material, such as a silicone oil or other silicone material in cured or uncured form and preferably dimethyl polysiloxane, which may be applied in either fluid or grease form by a timed fluid spray or wiping the grease thereon, before the electrical testing of the body during manufacture. These materials are characterized by high thermal and chemical stability, i.e., they are substantially inert.

The insulator body, so coated, is then placed in an inverted position with or without the metal cap of its closed end resting upon a grounded metal plate 20, as shown in Fig. 2. A high voltage conductor 21 is inserted into the body through its open end and the body is then subjected to a full flashover testing. The coating 19 affords to the ceramic surfaces themselves an effective moisture-repellent character and resistivity against the creation and deposit of contaminations such as nitrous acid in the presence of atmospheric moisture, with the result of preventing the formation of internal coatings and continuous paths for internal leakage currents with their harmful effects on the operating characteristics of the insulator, not only as manufactured but in use over a period of time because of the deteriorating action of such currents on the plugs for sealing the interior against the entrance of moisture. The cavity with or without filling with a dry gas or the insertion of a desiccant, is sealed by the plug 16. The metal cap 17 is then cemented over the plugged end to complete the insulator.

When an insulator is manufactured by the above described method, its electrical testing may be carried out with low leakage currents, a low power factor and low radio noise and with a substantial increase in the flashover voltage values. Moreover, since the interior water-repellent coating is not exposed to weathering, and maintains indefinitely its moisture-repellent character, the formation of continuous internal leakage current paths is eliminated even in the event of an imperfect or broken sealing of the open end of the porcelain body in use. The elimination of such currents avoids the burning and disintegration of the sealing means, thus maintaining indefinitely the efficient operation and useful life of the insulator with the desirable characteristics described above.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the materials and method steps will readily occur to those skilled in the art, within the spirit of the invention and the scope of the appended claims.

We claim:

1. A post type insulator comprising an elongated hollow body of ceramic material open at one end and closed at the other by said material, a coating of water-repellent dimethyl polysiloxane material applied directly to the contaminant free interior surfaces of said body and protecting the same against the deposit thereon of corona induced contaminants during electrical testing in manufactor, to reduce internal leakage currents, the power factor and radio noise and increase the flashover voltage, a plug sealing the open end of said body and metal caps secured by cement to the ends of said body.

2. The method of manufacturing a post type insulator having an elongated hollow body of ceramic material open at one end and closed at the other by said material, comprising the steps of covering the interior surfaces of said body with a coating of a substantially inert, water-repellent material to protect the same against the deposit thereon of corona induced contaminants during electrical testing in manufacture, thereafter subjecting the interior of said body through its open end to a high voltage electrostatic flashover test while said closed end of said body is grounded, and sealing and capping said open end.

3. The method of manufacturing a post type insulator having an elongated hollow body of ceramic material open at one end and closed at the other by said material, comprising the steps of covering the interior surfaces of said body with a coating of water-repellent silicone material to protect the same against the deposit thereon of corona induced contaminants during electrical testing in manufacture, thereafter grounding said closed end of said body, subjecting the interior of said body to a high voltage electrostatic flashover test, inserting a plug to seal said open end and cementing thereover a metal cap.

References Cited in the file of this patent

UNITED STATES PATENTS

| 1,728,531 | Estorff | Sept. 17, 1929 |
| 2,155,848 | Taylor | Apr. 25, 1939 |
| 2,776,332 | Von Cron | Jan. 1, 1957 |

FOREIGN PATENTS

| 740,938 | Great Britain | Nov. 23, 1955 |

OTHER REFERENCES

Publication: Electrical Engineering, page 71A, October 1956.

Publication II: Lapp Advertisement, Electrical World, Oct. 20, 1952, pages 76 and 77.